United States Patent [19]

O'Connor et al.

[11] Patent Number: 5,089,730
[45] Date of Patent: Feb. 18, 1992

[54] LOW NOISE DC ELECTRIC MOTOR

[75] Inventors: Edward M. O'Connor, Middlefield; William D. Riggs, Southington, both of Conn.

[73] Assignee: North American Philips Corporation, New York, N.Y.

[21] Appl. No.: 526,405

[22] Filed: May 18, 1990

[51] Int. Cl.⁵ .................................................. H02K 5/29
[52] U.S. Cl. ..................................... 310/51; 310/67 R
[58] Field of Search ............. 310/51, 269, 67 R, 156; 74/574

[56] References Cited

U.S. PATENT DOCUMENTS

| | | | |
|---|---|---|---|
| 1,504,551 | 8/1924 | Haas | 310/51 |
| 3,500,092 | 3/1970 | Heilmann et al. | 310/51 |
| 3,814,963 | 6/1974 | Laing | 310/217 |
| 4,336,470 | 6/1982 | Gutris | 310/67 R |
| 4,739,203 | 4/1988 | Miyao et al. | 310/67 R |

FOREIGN PATENT DOCUMENTS 9013167 4/1989 PCT Int'l Appl. .

Primary Examiner—Peter S. Wong
Assistant Examiner—Edward To
Attorney, Agent, or Firm—Robert J. Kraus

[57] ABSTRACT

A DC electric motor, which is much quieter than previous DC motors, is disclosed. The inventive motor includes a rotor and a stator, and either the rotor or the stator includes tynes bearing windings. Significantly, the tynes are interconnected, which reduces vibration and noise.

7 Claims, 5 Drawing Sheets

LOW NOISE DC ELECTRIC MOTOR

BACKGROUND OF THE INVENTION

1. Field of the Invention

The invention pertains generally to direct current (DC) electric motors.

2. Description of Related Art

As is known, a DC electric motor is a machine which converts DC electrical energy into mechanical energy. Typically, such a motor includes a rotor and a stator, with the rotor rotating relative to the stator during the operation of the motor. The desired mechanical energy is typically delivered via a shaft connected to the rotor.

The rotation of the rotor relative to the stator is achieved by interacting one or more DC current-carrying coils with one or more magnetic fields. By way of example, in one configuration of a conventional DC motor, the stator is provided with, for example, two magnetic pole pieces (i.e., permanent magnet pole pieces or electromagnet pole pieces), used to produce a stationary magnetic field within the stator. The rotor, which is rotatably mounted within the stator between the pole pieces, is provided with two or more electrical windings which are connected via a commutator (a mechanical rectifier) and brushes to a source of DC power. In operation, the commutator serves to periodically reverse the flow of DC current supplied to the windings, resulting in a unidirectional torque on the windings, and thus on the rotor.

In an alternative configuration, it is the rotor which is provided with the pole pieces and the stator which is provided with the windings. As depicted in FIG. 1, such a stator 10 typically includes a central yoke 20, to which is connected two or more angularly spaced tynes 30, each of which includes a lower leg 35 and a transverse upper leg 40 connected to the lower leg. As is conventional, the upper legs 40 are discontinuous, i.e., physically separated, to permit electrical windings 45 (only one of which is depicted in FIG. 1) to be readily wound about the lower legs. These windings are, in turn, connected to a source of DC power via, for example, a commutator and brushes.

DC motors are currently used in a variety of applications, typically where AC power is unavailable. One such use is, for example, in powering the fans employed in automobiles.

Significantly, DC motors are typically much noisier than, for example, AC motors. Until recently, the noise produced by DC motors was not considered significant. However, noise reduction has now become an important factor in a variety of applications. For example, the manufacturers of luxury automobiles are now demanding DC motors which are much quieter than conventional DC motors. As a consequence, relatively quiet DC motors are now being sought.

SUMMARY OF THE INVENTION

The invention pertains to a new, relatively quiet DC electric motor in which either the rotor or the stator includes tynes carrying windings.

Significantly, the invention involves the finding that the step-like changes in DC current supplied to the windings of a DC motor lead to corresponding step-like changes in the magnetic forces applied to the tynes, which cause the tynes to vibrate, and thus produce noise. (By contrast, in the case of AC motors, the windings are supplied with smooth, sinusoidally varying AC currents, which do not produce the vibrations associated with DC motors.)

The invention further involves the finding that mechanically interconnecting the upper legs of the tynes significantly reduces vibration and noise. While such interconnections can lead to significant short-circuiting of magnetic flux and a corresponding significant reduction in torque, it has been found that the dimensions of the interconnections are readily chosen to produce only insignificant short-circuiting of flux while achieving substantial reductions in vibration.

BRIEF DESCRIPTION OF THE DRAWINGS

The invention is described with reference to the accompanying drawings, wherein.

DETAILED DESCRIPTION OF THE PREFERRED EMBODIMENTS

The invention pertains to a DC electric motor which exhibits significantly less vibration, and noise, than previous DC motors.

The invention encompasses DC motor embodiments in which either the rotor or the stator includes tynes bearing windings. Moreover, these embodiments include both single-phase and multi-phase machines. Thus, for example, if the embodiment is a single-phase motor, then either the rotor or the stator will necessarily include two diametrically opposed tynes bearing windings. On the other hand, if the embodiment is a two-phase motor, than either the rotor or the stator will necessarily include at least four equiangularly spaced tynes bearing windings. Further, if the embodiment is a three-phase machine, then either the rotor or the stator will necessarily include at least three, and preferably six, equiangularly spaced tynes bearing windings.

If, for example, the stator includes the tynes bearing the windings, then it is the rotor which necessarily includes at least two magnetic poles (a north pole and a south pole) producing the magnetic field which interacts with the DC current-carrying windings, and vice versa. The magnetic poles are introduced using, for example, permanent magnets or electromagnets. Embodiments employing more than two magnetic poles, e.g., four magnetic poles (two north poles and two south poles), are not only useful but often preferred.

The invention also encompasses embodiments in which either the stator encircles the rotor or the rotor encircles the stator (the so-called inside-out configuration).

The invention further encompasses embodiments in which commutation is achieved either by employing conventional techniques, i.e., employing a conventional commutator and brushes, or, alternatively, by employing brushless techniques. One such brushless technique involves the use of solid state circuitry for selectively switching DC current to the various windings, in combination with position sensors, e.g., Hall cells, which sense the angular position of the rotor relative to the stator.

As mentioned above, the invention involves the finding that the noise produced by conventional DC electric motors is largely due to the vibrations of the tynes induced by the step-like changes in DC electric current supplied to the windings. As also mentioned, it has been found that these vibrations are readily substantially reduced, and the noise largely eliminated, by mechanically interconnecting the tynes. Significantly, while it was initially believed that such interconnections would lead to substantial short-circuiting of magnetic flux and a substantial reduction in torque, it has also been found that the dimensions of the interconnections are readily chosen to achieve substantial reductions in vibration and only insignificant short-circuiting of flux.

As a pedagogic aid to a more complete understanding of the invention, a description of a preferred embodiment of the inventive DC electric motor is given below.

Figure 1:
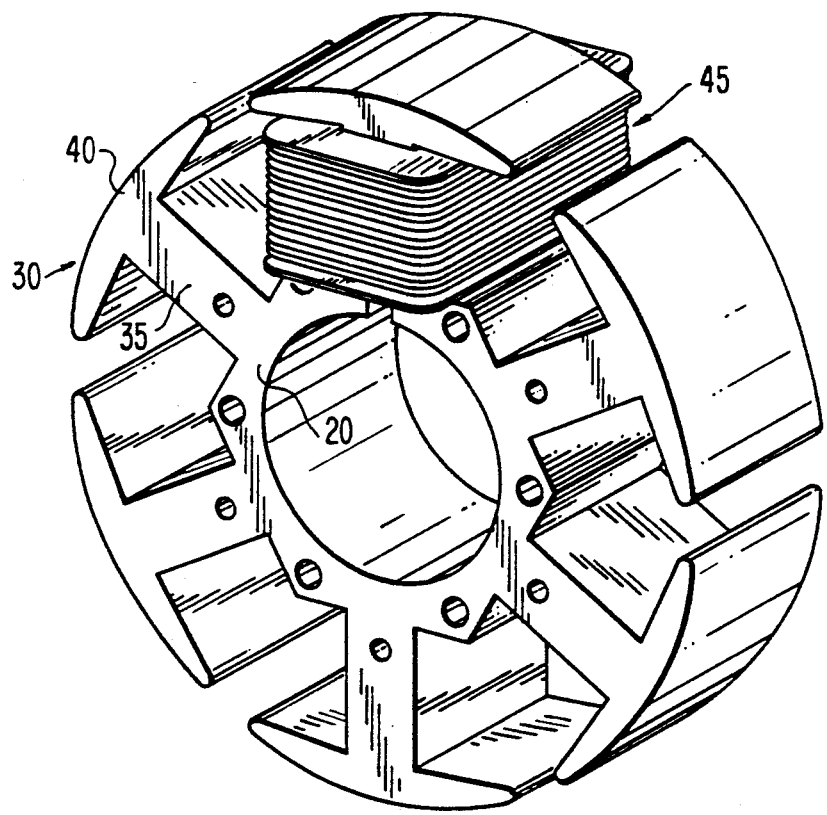
FIG. 1 is a perspective view of a stator of a conventional DC electric motor.
Figure 2:
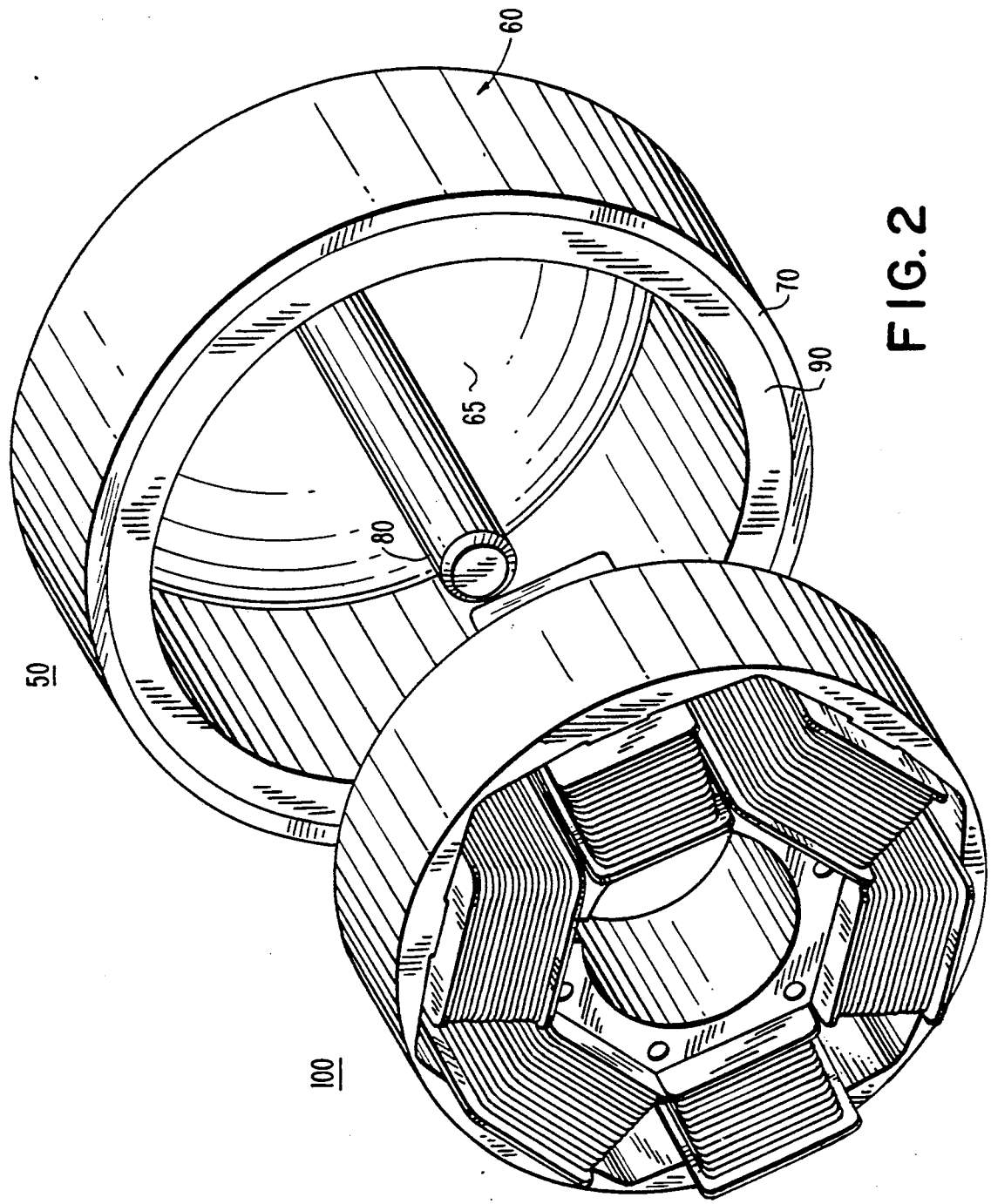
FIG. 2 is a perspective view of the rotor and stator of a preferred embodiment of the inventive DC electric motor, showing the rotor and stator separated from one another.
Figure 3:
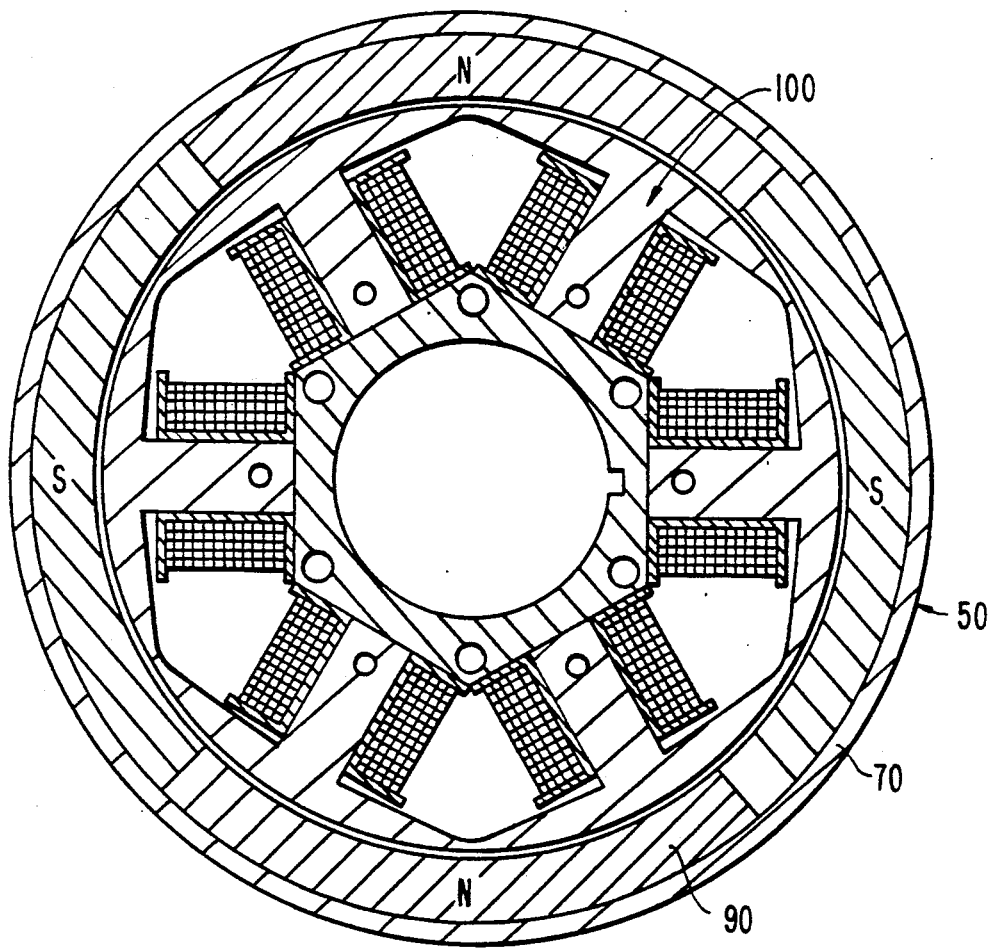
FIG. 3 is an end view of the preferred embodiment of the inventive DC electric motor, showing the rotor and stator in assembled relationship, absent the shaft connected to the rotor.

With reference to FIGS. 2 and 3, the preferred embodiment of the inventive DC motor includes a rotor 50 which encircles, and rotates about, a stator 100. The rotor 50 includes a housing 60 made of, for example, mild cold rolled steel. This housing includes a hemispherical portion 65 integral with an annular portion 70. A cylindrical shaft 80 protrudes from, and is connected to, the center of the hemispherical portion 65.

As shown, the rotor 50 also includes a ring 90 of magnetizable material, e.g., ferrite, bonded to the interior of the annular portion 70 of the housing 60. In use, the ring 90 is magnetized to preferably form four arc-shaped magnetic poles, as depicted in FIG. 3.

Figure 4:
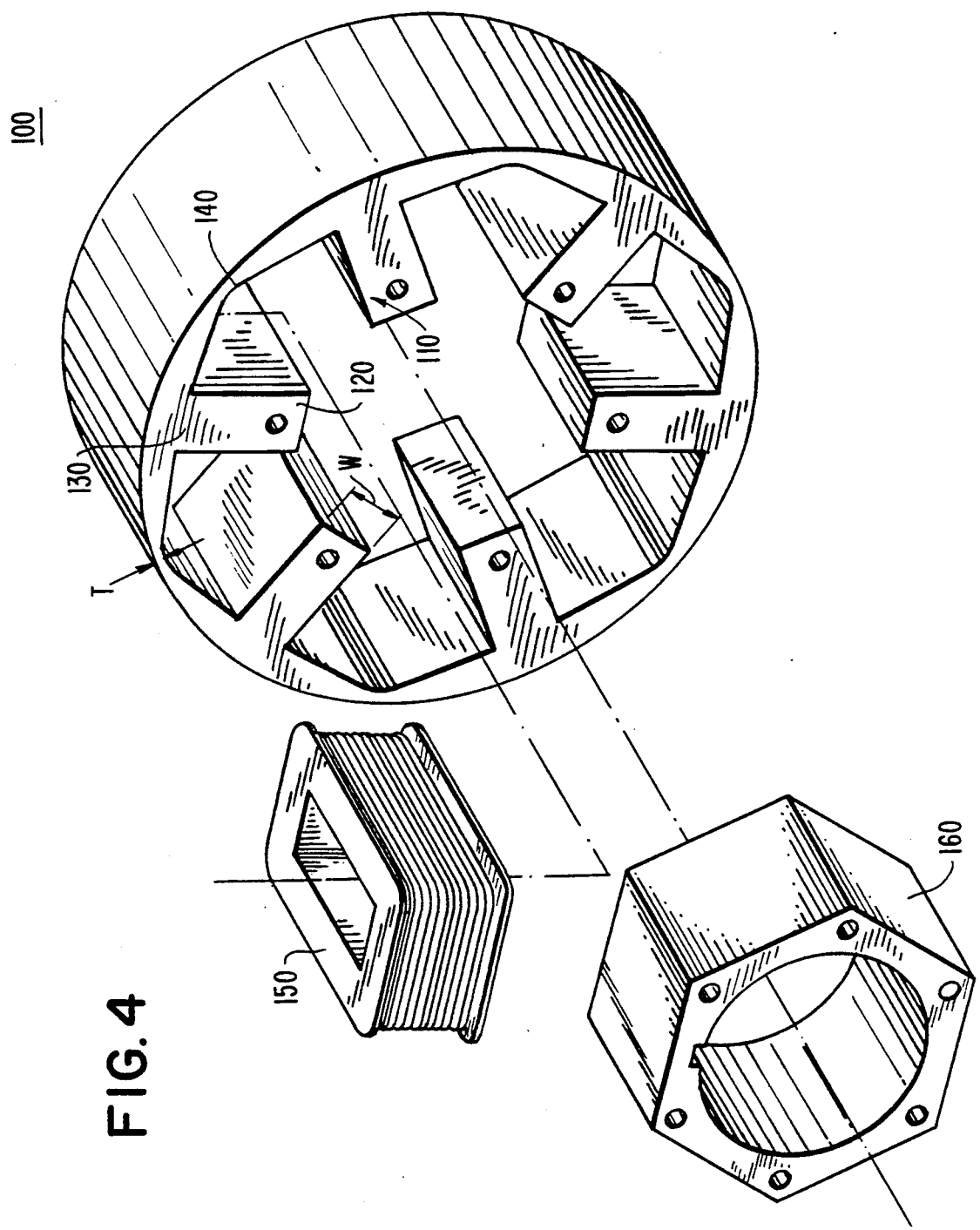
FIG. 4 is a perspective view of the stator of FIGS. 2 and 3, depicting the disassembled components of the stator.

With reference now to FIGS. 2, 3 and particularly 4, the stator 100, which is dimensioned to fit inside the rotor 50, is, for example, a three phase stator. Preferably, the three phase stator includes six radially inwardly projecting, equiangularly spaced, integrally connected tynes 110. Each such tyne includes a lower leg 120, which is generally rectangular in cross-section, and an arc-shaped upper leg 130 connected to the radially topmost portion of the lower leg 120. As shown, the ends of the upper legs 130 are integrally connected to one another by relatively thin material 140 which, for the sake of convenience, is hereinafter referred to as webbing. The tynes and webbing are made of magnetically permeable material such as, for example, electrical grade silicon steel. The stator 100 also includes six bobbin-wound bifilar windings 150 (only one of which is shown in FIG. 4), which permit three-phase operation. Each bobbin is generally rectangular in shape, and includes a central, rectangular aperture which permits the bobbin to be mounted onto the lower leg of a tyne.

To provide a return path for the magnetic flux produced by the windings when DC current flows through the windings, and to prevent the bobbin-wound windings 150 from falling off the lower legs of the tynes, the stator 100 also includes a hexagonal-shaped yoke 160. The yoke 160, which includes a central aperture for receiving the shaft 80, is made of a magnetically permeable material such as electrical grade silicon steel.

When assembling the stator, the bobbin-wound bifilar windings 150 are initially mounted on the tynes. The yoke 160 is then inserted into the center of the stator, with the hexagonal surfaces of the yoke contacting the lower surfaces of the lower legs 120.

As discussed above, the presence of the webbing substantially reduces the vibrations of the tynes during operation of the inventive DC motor, which substantially reduces the noise produced by the motor. As also discussed, the thickness of the webbing 140 is chosen so as to substantially reduce noise without significantly reducing rotor torque. In this regard, it has been found that the thickness of the webbing, T, preferable ranges from about 0.05W to about 0.20W, where W is the width of the lower leg of each tyne. Thicknesses less than about 0.05W are undesirable because the corresponding webbings are fragile and therefore difficult to manufacture. On the otherhand, thicknesses greater than about 0.20W are undesirable because they result in torque reductions which are no longer insignificant.

Figure 5:
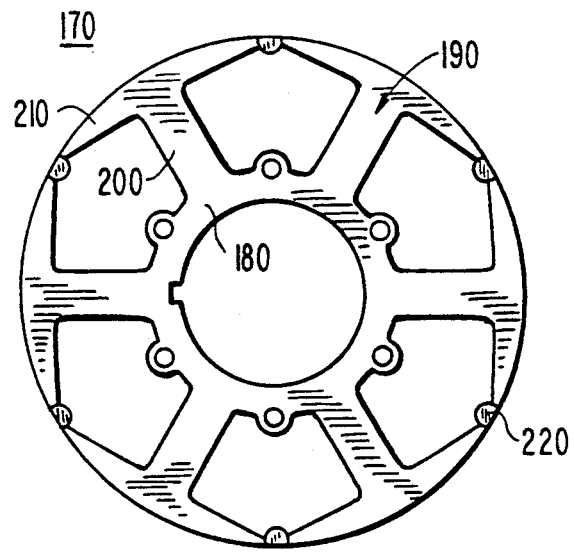
FIG. 5 is a front view of an alternative to the stator of FIGS. 2-4, showing the tynes connected with pins.
Figure 6:
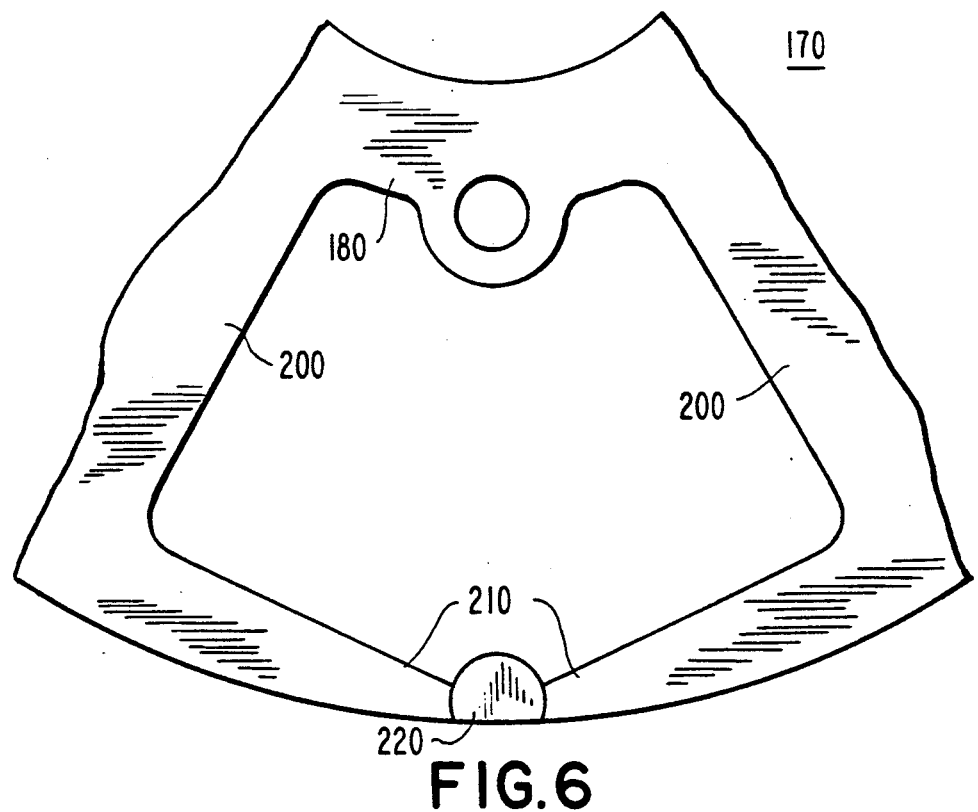
FIG. 6 is an enlargement of a portion of FIG. 5.

In an alternative to the stator depicted in FIGS. 2–4, which alternative is depicted in FIGS. 5 and 6, the stator 170 includes a central yoke 180 and six equiangularly spaced tynes 190 which are integrally connected to the yoke 180. Significantly, the upper legs 210 of the tynes are not integrally connected to each other, to permit windings to be wound about the lower legs 200 of the tynes. However, after the windings are formed, and in accordance with the invention, the upper legs 210 are mechanically interconnected by inserting solid, cylindrical pins 220, between the ends of the upper legs 210, which reduces vibration and noise. The pins, which are made of, for example, cold rolled steel, have outer diameters which range from about 0.05W to about 0.20W, for the reasons given above.

Rather than using solid pins, it has been found that hollow pins are also useful. When using hollow pins, the effective cross-sectional areas of the pins should extend over the same range as the cross-sectional areas of the solid pins.

Regardless of whether webbing or pins are employed, the inventive embodiments are far quieter than previous DC motors. Typically, the inventive embodiments exhibit noise levels which are at least 6 dB lower than the noise levels produced by conventional DC motors of similar size.

What is claimed is:

1. A DC electric motor, comprising:
   a rotor and a stator, said rotor being rotatably mounted relative to said stator, either said rotor or said stator including at least two tynes, with each tyne including a lower leg and a transversely oriented upper leg connected to one end of the lower leg, and an electrical winding encircling the lower leg of each tyne; and
   commutation means, capable of electrical communication with said windings and with a DC voltage or current source, for periodically reversing a flow of DC current to each of said windings, characterized in that
   said motor includes webbing extending between two adjacent ends of the upper legs of said at least two tynes, the lower leg of each tyne having a width, W and a thickness of said webbing ranging from about 0.05W to about 0.20W.

2. A DC electric motor, comprising:
   a rotor and a stator, said rotor being rotatably mounted relative to said stator, either said rotor or said stator including at least two tynes, with each tyne including a lower leg and a transversely oriented upper leg connected to one end of the lower leg, and an electrical winding encircling the lower leg of each tyne; and commutation means, capable of electrical communication with said windings and with a DC voltage or current source, for periodically reversing a flow of DC current to each of said windings, characterized in that said motor includes connecting means for mechanically connecting two adjacent ends of the upper legs of said at least two tynes, said connecting means including a pin interposed between said two adjacent ends.

3. The DC motor of claim 2, wherein said pin is solid.

4. The DC motor of claim 3, wherein the lower leg of each tyne has a width, W, and the outer diameter of said pin ranges from about 0.05W to about 0.20W.

5. The DC motor of claim 2, wherein said pin is hollow.

6. The DC motor of claim 1 or 2, wherein said stator includes said at least two tynes and corresponding windings and wherein said rotor encircles said stator.

7. The DC motor of claim 6 wherein said stator includes six tynes and corresponding windings and said rotor includes four magnetic poles.

* * * * *